Figure 1:
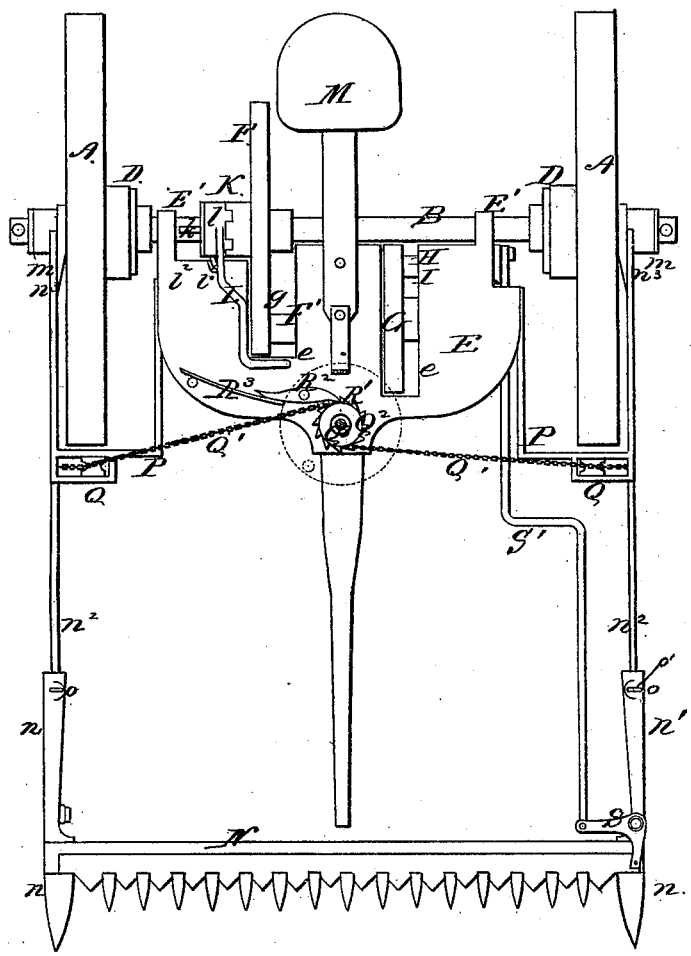

2 Sheets—Sheet 1.

G. S. PECK & W. KEELER.
MOWING-MACHINE.

No. 180,630. Patented Aug. 1, 1876.

Witnesses
Jos. B. Connolly
F. W. Dunwoody

Inventor
George S. Peck
William Keeler
Attorneys

2 Sheets—Sheet 2.
G. S. PECK & W. KEELER.
MOWING-MACHINE.
No. 180,630. Patented Aug. 1, 1876.
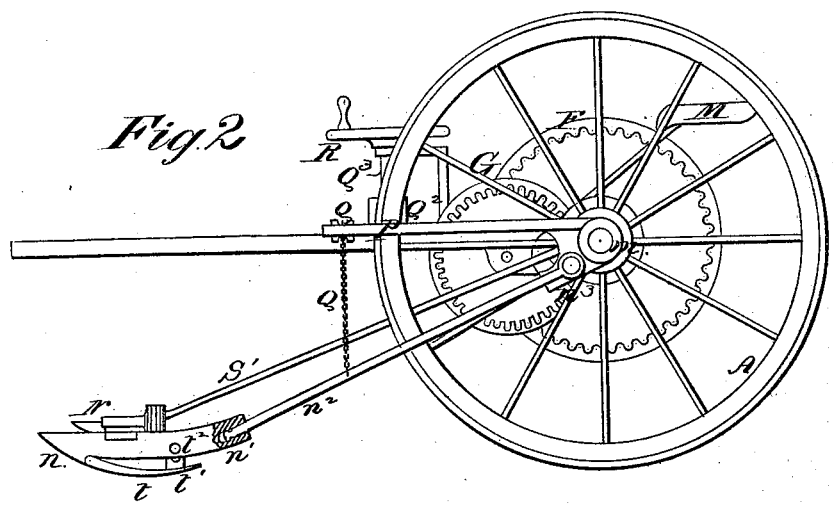
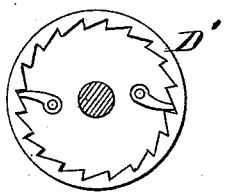
Witnesses
Jos. B. Connolly
By
J. W. Dunwoody
Inventor
George S. Peck
William Keeler
Attorneys

UNITED STATES PATENT OFFICE.

GEORGE S. PECK AND WILLIAM KEELER, OF TOWANDA, PENNSYLVANIA, ASSIGNORS TO THEMSELVES, GEORGE E. FOX, AND WM. H. MORGAN, OF SAME PLACE.

IMPROVEMENT IN MOWING-MACHINES.

Specification forming part of Letters Patent No. 180,630, dated August 1, 1876; application filed April 7, 1876.

*To all whom it may concern:*

Be it known that we, GEORGE S. PECK and WILLIAM KEELER, of Towanda, in the county of Bradford and State of Pennsylvania, have invented a certain new and useful Mowing-Machine; and we do hereby declare the following to be a full, clear, and exact description of the invention, such as will enable others skilled in the art to which it pertains to make and use it, reference being had to the accompanying drawings, which form part of this specification, in which—

Figure 1 is a top view of our invention. Fig. 2 is a side view, and Fig. 3 is a detail.

This invention has relation to mowing-machines, and consists in the novel construction, combination, and arrangement of parts, as hereinafter described and specifically claimed.

Referring to the accompanying drawings, A A represent the driving-wheels of the mower, supporting the axle B, to which they are loosely attached, but have pawl and ratchet, or clutch-connection therewith when moving forward, so as to rotate said axle. The mechanism for said connection is contained in the hub-boxes D. When the machine is reversed or backed the wheels turn freely upon the axle without rotating it.

E is the bed-tongue frame of the machine secured to the axle by the clips E'. F designates a large internally-toothed spur-wheel, loosely attached to the axle. F' is a shaft supported by boxes $ff$ underneath the bed E, and holding on one end the pinion $g$, engaging with spur-wheel F, and on the other end the internally-toothed spur-wheel G, which in turn engages with a pinion, H, on the inner end of a crank-shaft, I, through which motion is transmitted by pitman and bell-crank connection to the cutter. This arrangement of gearing, whereby the crank-shaft and axle are brought into close relationship and nearly on a line, produces what we term a second center, and constitutes one of the principal features of our invention.

The bed E is slotted at $e\ e$ for the passage of the large wheels F G, as shown.

K is a sliding clutch, one part of which is connected to the wheel F, and the other arranged to slide on the axle, the latter having a rib or feather at $k$, which enters a groove in the eye of the sliding section, and causes it to turn with the axle. Said sliding section is provided with a collar, $l$, having a spiral flange, $l^1$, which fits a corresponding notch, $l^2$, in the adjacent edge of the bed E, and is also provided with an operating-lever, L. By raising or lowering the latter, and turning the collar $l$, the collar, and with it the sliding clutch-section are caused to move lengthwise of the axle by the flange and notch $l^1\ l^2$, and the axle thereby brought into engagement with or disconnected from the wheel F.

The end of the lever L is bent so as to be operated by the driver's foot, he being seated at M.

N represents that portion of the machine containing the cutter-bar and guard-teeth, and supported at the ends upon the pilots $n$, the rear portions of which extend back and upward, and are formed into sockets $n^1$. These receive the ends of bars $n^2$, which extend back on the outer sides of the wheels, and are pivoted at their rear ends to plates or arms $n^3$, formed on or attached to collars $m$, fitted on the ends of the axle.

The forward ends of the bars $n^2$ are grooved for the purpose of giving purchase to the pins $o$, which secure said bars to the sockets $n^1$, the latter having eyes $o'$, through which said pins pass. By removing these pins the cutting attachments may be detached from the frame of the machine.

P P designate supplementary frames, consisting of bent bars embracing the wheels, each having one end attached to one of the collars $m$, and the other end attached to the adjacent side of the bed-plate E. These frames, extending forward, as shown, carry pulleys Q, over which pass chains $Q^1$ from a central drum, $Q^2$, on the bed E, to the bars $n^2$, to which they are attached.

The drum $Q^2$ is secured upon a vertical rotating shaft, $Q^3$, provided with a hand-wheel, R, on its upper end, and holds a ratchet, $R^1$, with which engages a pawl, $R^2$, pivoted upon the bed E, and controlled by the driver's foot. A spring, R³, holds said pawl in contact with the ratchet.

The chains and drum are for the purpose of allowing the cutting devices to be raised when the machine is not at work. The ratchet and pawl retain the elevated devices.

The connection of the operating devices with the cutter-bar is made through a bell-crank, S, at one end, and a pitman, S', already referred to.

The pilots $n$ are constructed with hinged shoes $t$, provided with perforated adjusting-standards $t^1$, connected to the rear portions of the pilots by screws or bolts $t^2$. The adjustment of these shoes gives the proper regulation to the height of cut.

Having described our invention, we claim as new, and desire to secure by Letters Patent—

1. In a mowing-machine, having the cutting apparatus located in front of the driving-wheels, the collars $m$ supported upon the shaft B outside of the wheels A A, and formed with projections or arms, to which are attached the connecting-bars $n^2$ of the cutting apparatus and the outer bars of the frames P, substantially as described.

2. The horizontal frames P, supporting the pulleys Q on their forward ends, embracing the wheels A A, and having their outer portions attached to the collars $m$, and their inner portions attached to the main frame, substantially as described and shown.

3. In combination with the finger-bar N, connected to the machine by the pivoted bars $n^2$, the chains $Q^1$, pulleys Q, drum $Q^2$, shaft $Q^3$, and pawl and ratchet $R^1$ $R^2$, substantially as described.

In testimony that we claim the foregoing we have hereunto set our hands this 13th day of March, 1876.

GEO. S. PECK.
WILLIAM KEELER.

Witnesses:
JOS. B. CONNOLLY,
THOS. A. CONNOLLY.